US010113878B2

(12) United States Patent
Pan et al.

(10) Patent No.: US 10,113,878 B2
(45) Date of Patent: *Oct. 30, 2018

(54) METHOD AND SYSTEM FOR SHARED TRANSPORT

(71) Applicant: Uber Technologies, Inc., San Francisco, CA (US)

(72) Inventors: Bin Pan, Belmont, CA (US); Hasrat Godil, San Francisco, CA (US); Brian Tolkin, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,373

(22) Filed: Feb. 23, 2018

(65) Prior Publication Data
US 2018/0180426 A1 Jun. 28, 2018

Related U.S. Application Data

(63) Continuation of application No. 14/942,361, filed on Nov. 16, 2015.

(51) Int. Cl.
*G01C 21/00* (2006.01)
*G01C 21/34* (2006.01)

(52) U.S. Cl.
CPC .............. *G01C 21/3438* (2013.01)

(58) Field of Classification Search
CPC ..... G01C 21/3438; G01C 21/26; G01S 19/42; G01S 5/0027; G07B 13/10; G07B 15/02
See application file for complete search history.

(56) References Cited

U.S. PATENT DOCUMENTS

| 5,168,451 A | 12/1992 | Bolger |
| 5,604,676 A | 2/1997 | Penzias |
| 5,945,919 A | 8/1999 | Trask |

(Continued)

FOREIGN PATENT DOCUMENTS

| CA | 2889853 | 5/2014 |
| JP | 2004-302941 | 10/2004 |

(Continued)

OTHER PUBLICATIONS

Hai Yang et al. "Equilibria of bilateral taxi-customer searching and meeting on networks", Transportation Research Part B., 2010, vol. 44, pp. 1067-1083.

(Continued)

*Primary Examiner* — Hussein A El Chanti
(74) *Attorney, Agent, or Firm* — Mahamedi IP Law LLP

(57) ABSTRACT

A transport arrangement system operates to provide a service, which can receive a transport pool request from a rider. The transport pool request can specify a set of parameters, including a pickup location and a drop-off location. A candidate set of transport providers are identified that satisfy one or more criterion, including a criterion of proximity relative to the pickup location. One of the candidate set of drivers is selected to provide a transport pool for the rider. The selection can be based at least in part on determining which individual drivers of the candidate set satisfy one or more constraints, including a first constraint that relate to a predicted trip completion time for the rider.

20 Claims, 6 Drawing Sheets

(56) References Cited

U.S. PATENT DOCUMENTS

| | | |
|---|---|---|
| 6,212,393 B1 | 4/2001 | Suarez |
| 6,356,838 B1 | 3/2002 | Paul |
| 6,618,593 B1 | 9/2003 | Drutman |
| 6,756,913 B1 | 6/2004 | Ayed |
| 6,925,381 B2 | 8/2005 | Adamczyk |
| 6,950,745 B2 | 9/2005 | Agnew |
| 6,989,765 B2 | 1/2006 | Gueziec |
| 7,080,019 B1 | 7/2006 | Hurzeler |
| 7,610,145 B2 | 10/2009 | Kantarjiev |
| 7,822,426 B1 | 10/2010 | Wuersch |
| 8,140,256 B1 | 3/2012 | dos-Santos |
| 8,285,571 B2 | 10/2012 | Demirdjian |
| 8,362,894 B2 | 1/2013 | Shah |
| 8,554,608 B1 | 10/2013 | O'Connor |
| 8,799,038 B2 | 8/2014 | Chen et al. |
| 9,483,744 B2 | 11/2016 | Ford |
| 9,488,484 B2 | 11/2016 | Ford |
| 9,552,559 B2 | 1/2017 | Ford |
| 9,558,469 B2 | 1/2017 | Ford |
| 9,569,740 B2 | 2/2017 | Ford |
| 9,599,481 B2 | 3/2017 | Ford |
| 9,671,239 B2 | 6/2017 | Ford |
| 9,689,694 B2 | 6/2017 | Ford |
| 9,715,667 B2 | 7/2017 | Ford |
| 2001/0037174 A1 | 11/2001 | Dickerson |
| 2001/0056363 A1 | 12/2001 | Gantz |
| 2003/0030666 A1 | 2/2003 | Najmi |
| 2004/0024789 A1 | 2/2004 | Ditcharo et al. |
| 2004/0049424 A1 | 3/2004 | Murray |
| 2004/0107110 A1 | 6/2004 | Gottlieb et al. |
| 2005/0153707 A1 | 7/2005 | Ledyard |
| 2006/0004590 A1 | 1/2006 | Khoo |
| 2006/0034201 A1 | 2/2006 | Umeda et al. |
| 2006/0059023 A1 | 3/2006 | Mashinsky |
| 2006/0200306 A1 | 9/2006 | Adamcyzk |
| 2006/0224437 A1 | 10/2006 | Gupta |
| 2007/0150375 A1 | 6/2007 | Yang |
| 2007/0255627 A1 | 11/2007 | Hallowell |
| 2007/0276595 A1 | 11/2007 | Lewinson |
| 2008/0055049 A1 | 3/2008 | Weill |
| 2008/0091342 A1 | 4/2008 | Assael |
| 2008/0270204 A1 | 10/2008 | Poykko |
| 2008/0277183 A1 | 11/2008 | Huang |
| 2009/0143965 A1 | 6/2009 | Chang et al. |
| 2009/0176508 A1 | 7/2009 | Lubeck et al. |
| 2009/0192851 A1 | 7/2009 | Bishop |
| 2009/0216600 A1 | 8/2009 | Hill |
| 2009/0281844 A1 | 11/2009 | Probst |
| 2009/0313077 A1 | 12/2009 | Wheeler, IV |
| 2010/0042549 A1 | 2/2010 | Adamczyk |
| 2010/0205017 A1 | 8/2010 | Sichelman et al. |
| 2010/0292914 A1 | 11/2010 | Vepsalinen |
| 2011/0000747 A1 | 1/2011 | Wu |
| 2011/0009098 A1 | 1/2011 | Kong |
| 2011/0099040 A1 | 4/2011 | Felt et al. |
| 2011/0118981 A1 | 5/2011 | Chamlou |
| 2011/0153629 A1 | 6/2011 | Lehmann et al. |
| 2011/0225269 A1 | 9/2011 | Yap et al. |
| 2011/0301985 A1 | 12/2011 | Camp et al. |
| 2011/0301997 A1 | 12/2011 | Gale et al. |
| 2012/0041675 A1 | 2/2012 | Juliver |
| 2012/0059693 A1 | 3/2012 | O'Sullivan |
| 2012/0078672 A1* | 3/2012 | Mohebbi ............ G06Q 10/0631 |
| | | 705/7.12 |
| 2012/0131170 A1 | 5/2012 | Spat |
| 2012/0203599 A1 | 8/2012 | Choi |
| 2012/0232943 A1 | 9/2012 | Myr |
| 2013/0054139 A1 | 2/2013 | Bodin |
| 2013/0073327 A1 | 3/2013 | Edelberg |
| 2013/0102333 A1 | 4/2013 | Dam |
| 2013/0132140 A1 | 5/2013 | Amin |
| 2013/0179205 A1 | 7/2013 | Slinin |
| 2013/0179215 A1 | 7/2013 | Slinin |
| 2013/0295963 A1 | 11/2013 | Sen |
| 2014/0011522 A1 | 1/2014 | Lin |
| 2014/0051465 A1 | 2/2014 | Ruys et al. |
| 2014/0067488 A1 | 3/2014 | James et al. |
| 2014/0082069 A1 | 3/2014 | Varoglu et al. |
| 2014/0129135 A1 | 5/2014 | Holden et al. |
| 2014/0129951 A1 | 5/2014 | Amin et al. |
| 2014/0156556 A1* | 6/2014 | Lavian ............... G06Q 30/0282 |
| | | 705/347 |
| 2014/0278838 A1 | 9/2014 | Novak |
| 2015/0012341 A1 | 1/2015 | Amin |
| 2015/0324945 A1 | 1/2015 | Ford |
| 2015/0046080 A1 | 2/2015 | Wesselius |
| 2015/0154810 A1 | 6/2015 | Tew |
| 2015/0323327 A1 | 11/2015 | Ford |
| 2015/0323329 A1 | 11/2015 | Ford |
| 2015/0323330 A1 | 11/2015 | Ford |
| 2015/0323331 A1 | 11/2015 | Ford |
| 2015/0324334 A1 | 11/2015 | Ford |
| 2015/0324717 A1 | 11/2015 | Lord |
| 2015/0324734 A1 | 11/2015 | Ford |
| 2015/0325158 A1 | 11/2015 | Ford |
| 2015/0339923 A1 | 11/2015 | Konig |
| 2015/0345951 A1* | 12/2015 | Dutta ................. G01C 21/3605 |
| | | 701/400 |
| 2016/0019728 A1 | 1/2016 | Petrie |
| 2016/0027306 A1* | 1/2016 | Lambert ................ G08G 1/123 |
| | | 701/117 |
| 2016/0034828 A1 | 2/2016 | Sarawgi |
| 2016/0117610 A1* | 4/2016 | Ikeda ..................... G06Q 10/02 |
| | | 705/5 |
| 2016/0138928 A1* | 5/2016 | Guo ................... G01C 21/3438 |
| | | 701/537 |
| 2016/0180346 A1 | 6/2016 | Cheng |
| 2016/0364678 A1 | 12/2016 | Cao |
| 2017/0193404 A1 | 7/2017 | Yoo |
| 2017/0300848 A1 | 10/2017 | Shoval |

FOREIGN PATENT DOCUMENTS

| | | |
|---|---|---|
| JP | 2004-362271 | 12/2004 |
| JP | 3934985 | 6/2007 |
| JP | 2014-130552 | 6/2014 |
| JP | 2004-073639 | 5/2015 |
| KR | 10-2010-0053717 | 5/2010 |
| KR | 10-2014-0124137 | 10/2014 |
| KR | 10-2015-0045962 | 4/2015 |
| WO | WO 1999/044186 | 2/1999 |
| WO | WO1999044186 | 9/1999 |
| WO | WO 2005/013588 | 2/2005 |
| WO | WO2014106617 | 7/2014 |

OTHER PUBLICATIONS

International Search Report in PCT/US2015/034831 dated Sep. 24, 2015.

International Search Report in PCT/US2015/043654 dated Nov. 26, 2015.

International Search report in PCT/US2016/016858 dated May 19, 2016.

IPRP in PCT/US2014/069602 dated Jun. 14, 2016.

Alfred Round, et al.: Future Ride: Adapting New Technologies to Paratransit in the United States, UC Transportation Center Berkeley, CA, UCTC No. 306 (1996).

Kikuchi, et al., "Advanced Traveler Aid Systems for Public Transportation", US Department of Transportation, Sep. 1994.

Fu, et al., "On-Line and Off-Line Routing and Scheduling of Dial-a-Ride Paratransit Vehicles", Computer-Aided Civil and Infrastructure Engineering 14 (1999).

International Search Report and Written Opinion issued in PCT/US2016/062344 dated Jan. 31, 2017.

Extended Search Report issued in EP 14869805.3 dated May 10, 2017.

Extended Search Report issued in EP 15826507.1 dated Nov. 10, 2017.

International Search Report in PCT/US2017/053065 dated Sep. 22, 2017.

(56) References Cited

OTHER PUBLICATIONS

Written Opinion issued in SG 11201700669R dated Dec. 5, 2017.
Robert Kuhlthau and Ira D. Jacobson, The Development of a Model for Predicting Passenger Acceptance of Short Haul Air Transportation Systems, NASA, Sep. 1977.
Xing Wang, Optimizing Ride Matches for Dynamic Ride Sharing Systems, GIT, May 2013.
International Search Report issued in PCT/US2017/053065 dated Dec. 13, 2017.

* cited by examiner

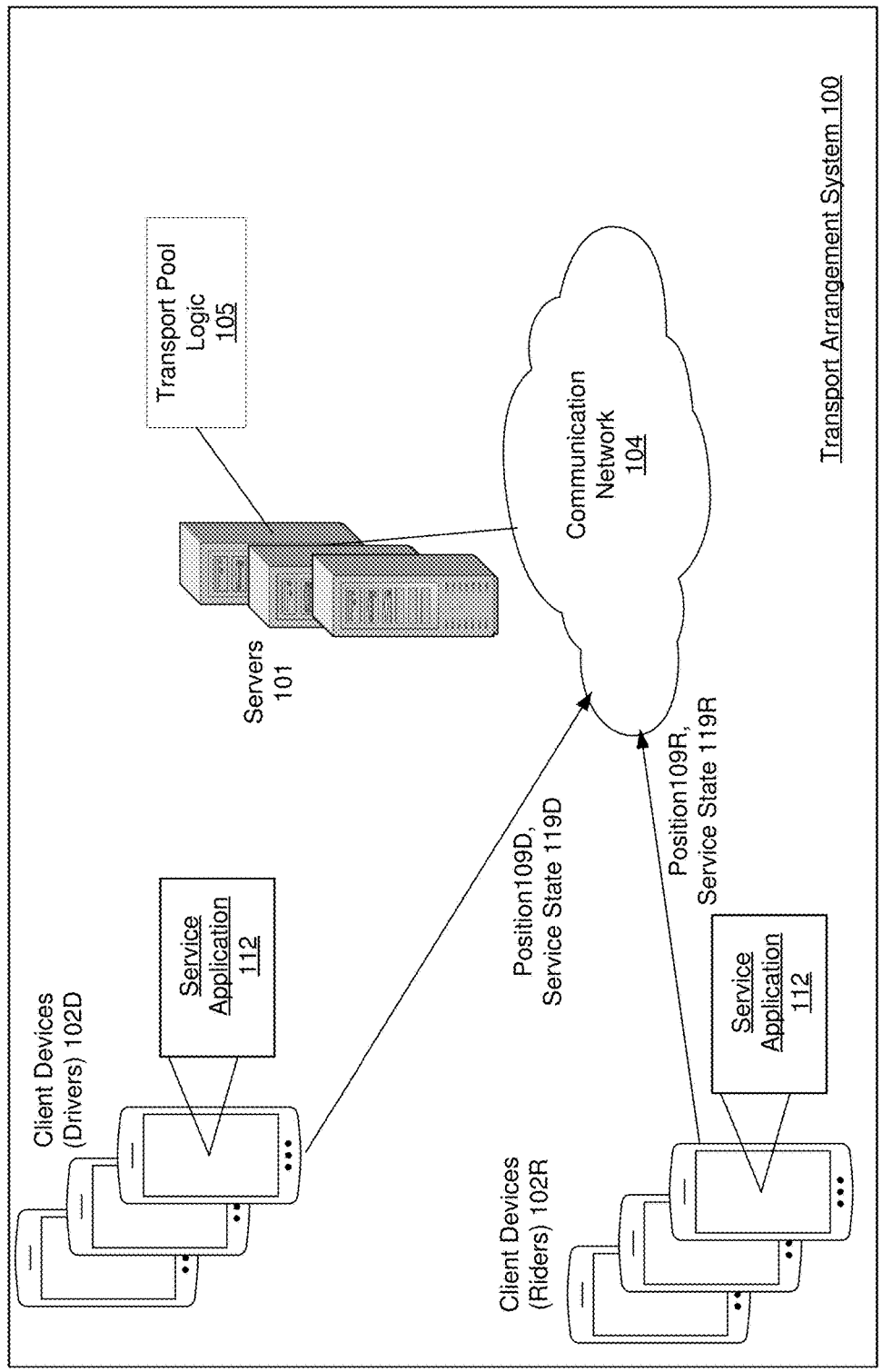

METHOD AND SYSTEM FOR SHARED TRANSPORT

CROSS-REFERENCE

This application is a continuation of U.S. patent application Ser. No. 14/942,361 filed Nov. 16, 2015, which application is hereby fully incorporated by reference herein in its entirety.

BACKGROUND

Transport services are increasingly becoming more diverse and common, particularly with advances in location-dependent services. Many such services enable individual users to request transportation on demand. For example, transport services currently exist which enable vehicle drivers to provide transport for other potential passengers in a transport pooling arrangement, as well as to deliver packages, goods and/or prepared foods.

BRIEF DESCRIPTION OF THE DRAWINGS

FIG. 1 illustrates an example transport arrangement system for providing pooled transport services.

DETAILED DESCRIPTION

Figure 2A:
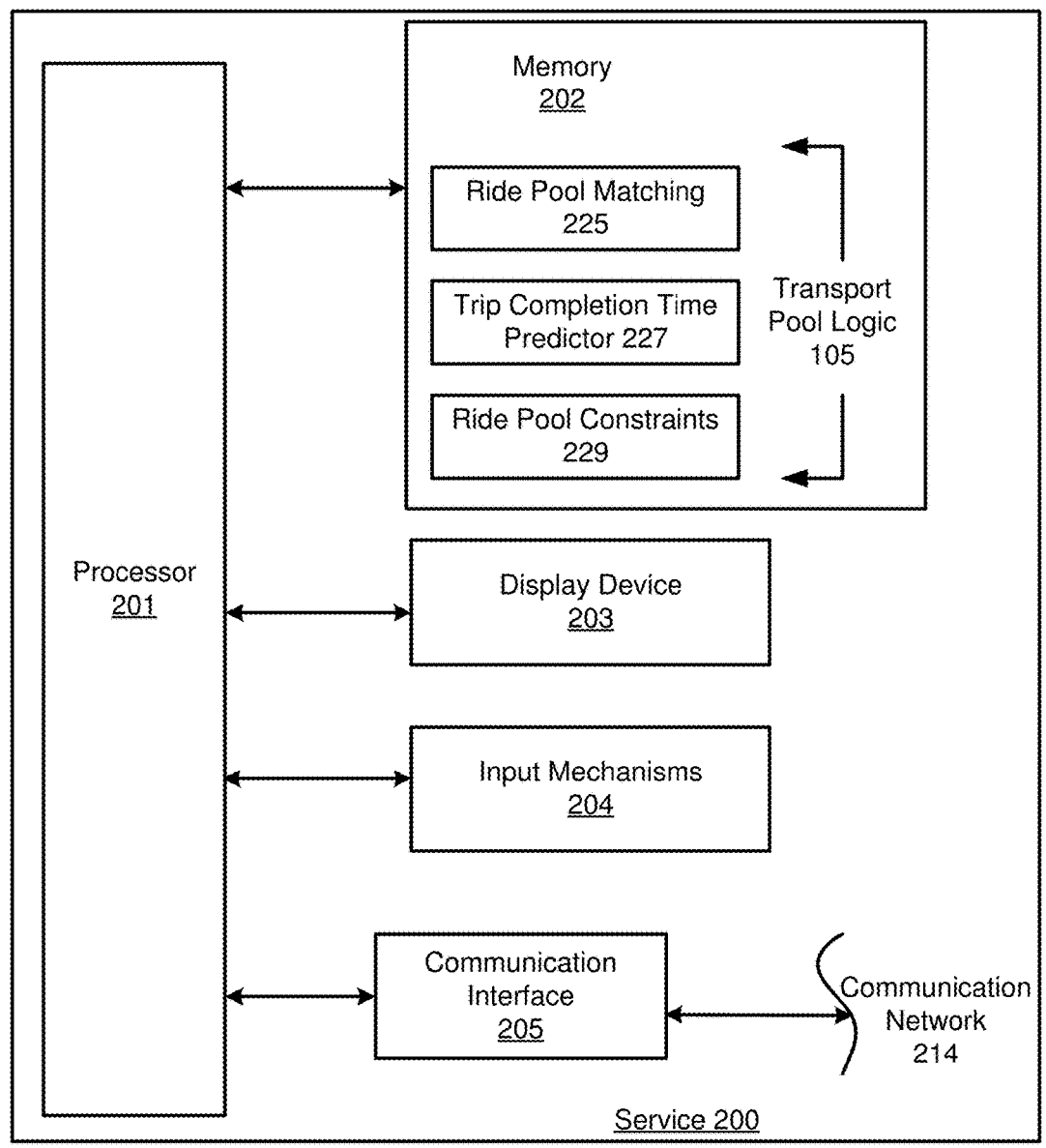
FIG. 2A illustrates an example of a transport arrangement service for arranging rider pools.

According to examples, a transport arrangement system operates to provide a service, which can receive a transport pool request from a rider. The transport pool request can specify a set of parameters, including a pickup location and a drop-off location. A candidate set of transport providers are identified that satisfy one or more criterion, including a criterion of proximity to the pickup location. One of the candidate set of drivers is selected to provide a transport pool for the rider. The selection can be based at least in part on determining which individual drivers of the candidate set satisfy one or more constraints, including a first constraint that relate to a predicted trip completion time for the rider.

With reference to examples described, a transportation pool service (sometimes referred to as a "rider pool") refers to a service which transports multiple riders between different pickup and drop-off locations. In contrast to conventional approaches (e.g., bussing), however, a transport pool service, for purpose of this application, does not have preset pickup or drop-off locations, or even a route of travel. Rather, the transport pool service is implemented with at least two classes of users—driver class users and rider class users, both of whom utilize technological functionality and services of an intermediary computer system. With integration of the intermediary computer system, examples enable a transport pool service that is ad-hoc, so that riders have no set pickup location or time, and drivers have no advance knowledge of pickup locations beyond what may be deduced from historical pattern or experience of the driver.

Moreover, examples recognize that in urban environments, public events, construction, emergencies, and various other events can change the needs of riders, as well as the availability of drivers. As described in more detail, examples provide a transport arrangement system that is dynamic with respect to information that users of the service can utilize to more effectively receive or provide transport.

In many examples, a transport pool service (alternatively referred to as a "ride pool service" or "ride pool") can be implemented when a driver class user operates a vehicle to pick up a first rider at a first pickup location for transport to a first drop-off location, and while the trip of the first rider is in progress, the driver receives a request to pick up a second rider for transport to a second drop-off location. The driver picks up the second rider, so that the first and second riders are in the vehicle together for at least a duration of time, until one of the two riders departs from the vehicle. Consequently, in a rider pool, there are at least two riders whom overlap in time within the vehicle, with each rider having his or her own pickup and drop-off locations In such an example, some embodiments provide a transport arrangement system which serves the relevant classes of users (e.g., driver and rider class users) by (i) selecting the driver for the first rider based on parameters such as proximity and/or wait time for pickup for the single rider, and (ii) determining when the driver is a suitable candidate for the second pickup request, which would result in the existing transport becoming a ride pool. According to some examples, the transport arrangement system uses real-time processes and information to enhance or better the selection processes where each of the riders are selected for the rider pool.

In particular, a transport arrangement system of some examples can provide a network service to optimize rider/driver pairings based on wait time of riders as a group over a given geographic span. As an addition or alternative, a transport arrangement system of some examples can implement constraints or optimization parameters which limit or optimize against negative or unwanted aspects of rider pooling, such as the amount of additional trip time for the first rider should a second rider be added.

Still further, many examples described herein provide a transport arrangement system or service for ride pooling in which estimates or guarantees of trip completion times can be provided. Among other benefits, estimates or guarantees of trip completion times can be provided despite inherent uncertainty from (i) selecting a suitable driver for a pickup request, (ii) arranging for the selected driver to arrive at the pickup location within an acceptable duration of time, and (iii) while the trip of the rider is in progress (e.g., after when the rider enters the vehicle) arranging for the driver to arrive at a drop-off location of the pickup request. For ride pools, the uncertainty increases significantly in that the selected driver for the pickup request may have a rider already present, and/or may pick up another rider after the current rider starts his or her trip. Accordingly, in order to provide certainty in terms of trip completion time for individual users of a ride pool, a transport arrangement system may take into account, through constraints and/or optimization processes, facets of rider pooling that include a maximum number of passengers for vehicles that may provide ride pool services, route deviation (to individual riders or driver) to accomplish pooling, variation in arrival locations for riders of a pooled transport, an actual or projected estimate of vehicle availability (or supply), and an actual or projected estimate of riders (or demand).

When rider pooling is being provided, a transport arrangement service determines, for each pickup request of a given rider, whether the rider is to be a solitary rider (at least initially) or matched with a vehicle that is completing a trip with one or more existing riders. Examples recognize that when such determinations of rider pairing are intelligently made in a manner that balances interests of riders and drivers, the modifications and overall trip completion times for arranged ride pools is decreased significantly. As a result, this reduces fares to each rider, while increasing revenue and/or profit (when cost of driving is considered) for the driver.

In some examples, a transport arrangement system or service is provided which can estimate an trip completion time under a best (with minimum number of additional riders or pickups in rider pool) and worst case scenario (with maximum number of additional riders or pickups in rider pool). As described in greater detail, estimations of trip completion times for riders of a rider pool require acquisition of various kinds of real-time information, as the availability of rider pools is significantly affected by dynamically occurring events and changing conditions that are at times unpredictable or difficult to forecast. Examples intelligently implement rider pooling when events or conditions that affect an outcome of a rider pool (e.g., whether a given vehicle with a rider is to pick up another rider) occur while the driver is on-trip for the first rider.

As used herein, a client device includes a mobile computing device that is operated by a user of a transport arrangement system. In specific examples, a client device executes a service application, or is otherwise programmatically equipped to open and maintain a communication channel with a transport arrangement service that is provided over the Internet. Examples further provide for multiple classes of users, including a rider class user and a driver class user. In some implementations, client devices of rider class users operate differently than those of driver type devices. For example, a transport arrangement system may provide different kinds of real-time information for a client device of a rider as compared to a driver. Moreover, the functionality, user interface(s) and services offered to each type of user may be different.

In numerous implementations, a client device and/or vehicle communication device can also operate a designated application configured to communicate with the service arrangement system. For example, a rider may include a mobile computing device that executes a rider application having functionality for receiving rider services, such as for viewing availability of transport services provided through a transport arrangement service. Similarly, a driver class user, operating a transport vehicle, can operate a mobile computing device that executes a driver service application having functionality related to providing transport services, including pooled transport services.

By way of example, mobile computing devices, in context of client devices, can include cellular-capable devices, such as smartphones, feature phones, suitably capable laptops, notebooks, tablets (or hybrid devices or "phablets"), and/or other multi-functional computing devices capable of telephony/messaging. In variations, a mobile computing device can include a roaming device, which is a device that can use a wireless link(s) (e.g., wireless connection implemented through a medium that uses a Bluetooth or 802.11 protocol; infrared; RF channel; Near-Field Communication ("NFC") etc.) to access a network service over, for example, the Internet. By way of example, such devices can include tablet devices or wearable electronic devices which sometimes link with another device that can operate as a proxy.

While numerous examples provide for a driver to operate a mobile computing device as a client device, variations provide for at least some drivers to operate a vehicle communication device. A vehicle communication device can be implemented using, for example, custom hardware, in-vehicle devices, and/or suitable equipped devices that provide alternative On-Board Diagnostic ("OBD") functionality.

Still further, while some examples described herein relate to pooled on-demand transport services for riders, other examples include a transport arrangement service to provide an on-demand transport service for transporting items such as prepared food, packages or specialty items (e.g., kittens). Examples further provide for a transport arrangement system that provides on-demand transport services for such items in an ad-hoc manner, subject to dynamic conditions and events such as exist for rider pooling. For such examples, a transport arrangement system operates to pool resources of service providers to fulfil transport requests of multiple users (e.g., individual requesting package delivery to a drop-off location or delivery of food item to a particular location).

In variations, a transport arrangement system is implemented for individuals and service providers with regard to time-sensitive products or services that need certain timeliness guarantees. For example, a user can request an on-demand delivery service (e.g., food delivery, messenger service, food truck service, or vegetable products shipping) using a pooled transport service provided through a transport system, as described by examples provided herein.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, laptop computers, printers, digital picture frames, network equipment (e.g., routers), wearable devices, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example transport arrangement system for providing pooled transport services. According to an example of FIG. 1, a transport arrangement system 100 is distributed amongst centralized network machines (e.g., servers 101) and client devices 102 which are operated by users of a transport arrangement service provided through the system 100. In an example of FIG. 1, the client devices 102 can be operated by multiple classes of users (e.g., driver class users, rider class users). The transport arrangement system 100 can be heterogeneous in nature, in that the various end user devices can be provided in a variety of platforms or form factors (e.g., multi-functional cellular telephony/messaging devices, tablet device, wearable electronic device, etc.). The implementation of transport arrangement system 100 as a network platform can entail client devices 102 having functionality for establishing and/or maintaining a communication channel with servers or other network resources of the transport arrangement system 100. By way of example, the individual client devices 102 can establish and maintain an Internet Protocol connection that is established over a wireless communication medium.

The transport arrangement system 100 can be implemented as a network platform using multiple networks (e.g., cellular networks, Internet) and communication mediums (e.g., such as provided through cellular, 802.11 or Bluetooth protocols, Ethernet, etc.), which are collectively represented as a communication network 104.

Collectively, the client devices 102 of the various end users can be heterogeneous in terms of device platform or form factor. In one implementation, each client device 102 executes a service application 112 that establishes a communication channel with a corresponding server 101 of the transport arrangement system 100. The service applications 112, when executed on corresponding client devices 102, can also interface with, for example, hardware resources such as geo-aware components (e.g., GPS) and sensors, as well as data sets (e.g., third-party maps) and other application functionality (e.g., calendar application).

Among other technological features, the transport arrangement system 100 operates to aggregate data from various client devices 102 in order to provide a variety of functionality and service enhancements with regard to an on-demand transport arrangement service. In one aspect, the transport arrangement system 100 implements technology to maintain privacy of end users, while at the same time employing client devices 102 as data acquisition elements of the network platform. According to examples, the technological considerations for implementing an on-demand transport arrangement service that uses the network platform are considerably more complex than, for example, simply protecting user data stored on a computing device. Examples recognize that for many transport arrangement services and service enhancements to be effective, the transport arrangement system 100 acquires user information from end users devices 102R-n (representing rider client devices) and 102D-n (representing driver client devices). Among other challenges, the transport arrangement system 100 aggregates private information in real-time from the client devices, including (i) position information 109R, 109D from client devices 102R, 102D for riders and drivers, and/or (ii) service status information 119R, 119D, in order to provide service and non-private service related information for the population of users, as described in greater detail below.

According to examples, various aggregations of aggregated user information can be obtained and formulated into concrete, real-time information that does not compromise privacy of the end users, such that private information of a given user is not discloses to another user under a condition or otherwise in a manner that would violate a privacy constraint, condition or rule. By way of example, the transport arrangement system 100 can be used to obtain the real-time position information 109R, 109D and service status information 119R, 119D from the client devices of individual users. The service status information 119R can identify information such as whether a rider class user has requested a transport service, whether the rider class user is receiving the transport service, or whether the rider class user is likely to request the transport service (e.g., based on the user interaction with a corresponding client user device). The status information 119D for the driver class user can include information that indicates whether the driver is available to provide a transport service or assigned or on a trip (e.g., "occupied"). As an addition or alternative, the status information 119D can indicate whether driver is assigned to a transport request but has yet to arrive at a pickup location. As another addition or alternative, the status information 119D can indicate whether the driver has been assigned the transport request for a duration of time that permits reassignment (e.g., when the driver has yet to arrive at a pickup location and the current assignment has not exceeded a threshold time limit).

In similar fashion, the position information 109R, 109D of users in a given geographic region can be used to determine, for example, a number of riders or drivers in that region. When combined with the service status information 119R, the position information 109R, of the various rider class users can define, for example, a demand/or potential demand for an on-demand transport service. Likewise, the combination of position information 109D and service status information 119D for driver class users can determine a supply or potential supply for an on-demand transport service. The real-time acquisition and update of demand and supply information can further lead to service enhancements, such as better predictability of trip completion times or trip completion times, and/or real-time price adjustments to adjust demand and/or supply. With examples such as shown by FIG. 1, enhancements, including determination of demand and supply, can be made specific to transport pool services. As a result, such enhancements can be implemented with ride pool services to optimize the transport arrangement system 100 by, for example, reducing expenditure of driver resources (e.g., available drivers, fuel of vehicle operated by individual driver) relative to total income earned by drivers.

Additionally, the optimization functionality of the transport arrangement system 100 can improve the efficiency of the components of network platform, in that the client devices 102R, 102D and servers 101 are used more efficiently when a pooled transport service is provided rather than a singular transport service. For example, an operational duration and/or quantity of computational resources required for client devices 102R, 102D to receive/provide a pooled transport can be significantly reduced as compared to an alternative service which does not optimize for users as a group or population. The reduction of the operational duration and computational resources can translate to battery conservation for the client devices 102R, 102D, as well as increasing bandwidth for neighboring client devices 102R, 102D.

With further reference to an example of FIG. 1, the transport arrangement system 100 can be implemented as a distributed network platform, in order to securely acquire and aggregate information from client devices 102R, 102D without violating privacy constraints or rules. As a distributed network platform, the transport arrangement system 100 is able to acquire accurate, real-time and reliable information that can serve the purpose of intelligent or optimized implementation of rider pooling and/or other transport arrangement services. Furthermore, the acquisition of such information can promote or enable the transport arrangement system 100 in predicting completion times of trips for transport services in which pooling can occur. As described in greater detail, some variations provide that the transport arrangement system 100 calculates predicted completion times for prospective pairings for riders in a rider pool before assigning riders to corresponding vehicles. The calculation of predicted completion times can enable the transport arrangement system 100 to implement constraints on rider pairings, by for example, limiting the deviation of an existing trip to accommodate rider pooling when a trip of a newly added rider causes the completion time of the existing trip to exceed a given threshold. The calculation of predicted completion times for prospective pairings can further be averaged, or subjected to statistical or historical analysis, in order to determine the threshold of comparison for when prospective rider pairings are evaluated for suitability in pairing with an existing rider pool.

Additionally, the acquisition of real-time information from client devices 102 can enable predictions of vehicle occupancy, supply and/or demand, and price for a pooled transport service. As with other examples, the predictions can be made in real-time using information that is itself obtained in real-time.

In the context of examples provided, the term "supply" is primarily understood to mean a number of service providers (e.g., drivers) in a given geographic region. In many examples, the number of service providers can be refined to mean those service providers who are available to provide the service, and/or those service providers who will be available to provide service within a threshold period of time. The term "demand" is primarily understood to mean rider class users. The term demand can also be refined in variations to include (or exclude) riders who, in a given instance or duration, are actively receiving the service, or those users for whom there exist only an uncertain probability that a transport request will be made.

As illustrated by examples of FIG. 1, the transport arrangement system 100 can provide an on-demand service in which client devices 102R, 102D are both user end devices and source devices for information used by the transport arrangement system 100. The information obtained by the transport arrangement system 100 from the client devices 102R, 102D (e.g., position information, service status information) adjust the manner in which the on-demand service is provided. Thus, each client device 102R, 102D can operate as part of the transport arrangement system 100 to obtain or provide services for a given user, while at the same time providing information (e.g., user position or service state information) for affecting implementation of the on-demand service to a larger group of users (e.g., riders in a given number of blocks within a city).

As the transport arrangement system 100 utilizes client devices 102 as source devices for information, the role of a centralized or intermediary computer, such as provided by the one or more servers 101, can be to implement decisions objectively, so as to optimize or adhere to desired constraints for the larger group of riders and drivers, rather than serve the best needs of the individual rider or driver.

Among other technical benefits and objectives, the servers 101 can implement functionality for acquiring information for making such determinations, as well as processes for making the determinations using the acquired information, in a manner that excludes human involvement or influence. According to one aspect, the servers 101 implement functionality that is technical in aggregating information that is otherwise deemed private when non-aggregated, in order to use the information to enhance or augment services for a larger group of users. According to another aspect, the servers 101 implement functionality that uses the aggregated information to determine supply, demand, arrival or total trip time and predictions thereof, including predictions of vehicle occupancy in rider pooling.

By way of example, a transport arrangement system 100 can be implemented so that the client device 102D of the driver automatically communicates position information to a service of the transport arrangement system whenever the driver device is made available for use in connection with transport services provided through the transport arrangement system 100. The client device 102D can disable or actively preclude the driver from, for example, disabling or altering the geo-aware resources of the client device 102D, so that the source of information for the position of the driver at a particular instance is provided by the geo-aware resource (e.g., GPS) of the driver device, without interruption or influence from the driver. In this respect, the transport arrangement system 100 implements functionality which lacks a manual alternative, as a remote computation mechanism ensures the validity of the acquired data from the various users who may be inherently biased and not sufficiently reliable or precise. For example, the service of the transport arrangement system 100 cannot ask the driver his or her position at a given instance because (i) the driver will likely not be able to know with sufficient granularity, and (ii) information provided by the driver is suspect, as the driver has self-motivation of reducing perceived expenditure.

As an illustration of the latter case, if a driver is asked his position when the driver is on-trip, and the driver knows he is near the end of the trip, examples recognize that the driver may naturally act for his own interest by providing information that is inaccurate, to sway the entity making the determination to assign the new rider to the driver, so that the driver's rider pool is maximized. The outcome of the determination may be that the route of the driver is deviated to the second rider, when the more optimal determination (based on the actual real-time position of the driver) would be to drop-off the first rider, then head back and pick up the second rider, or alternatively, to have a second vehicle pick up the second rider because the addition of the trip time to the first driver would violate a constraint of total trip time of the first rider. Not only would the driver have a bias to provide inaccurate information, the driver would not have information to make the optimal determination, as the information needed to determine optimal pickup pairings is done in real-time, meaning from the use of real-time position and status information 109, 119 from a population of users (both riders and drivers). Because the transport arrangement service utilizes real-time information, the actual determination of which driver/rider pairing is needed can be made over a duration of time (e.g., 30-seconds) during which the determination can change based on fluctuations to demand and supply, as well as projected routes of the driver's trips and new trips in progress.

Examples recognize that manual input or influence from any user of transport arrangement system 100 would undermine an ability of the system to optimize and implement constraints that are designed for predictability or efficiency. For example, riders may receive discounts for enabling ride pooling on their transport requests, but conversely, riders generally do not like to share confined spaces with strangers. Riders thus have motivation to provide information that would influence a decision against pooling the transport being provided to the particular rider. For such reasons, transport arrangement system 100 can provide the service application with functionality that disables or otherwise precludes any user from disrupting or influencing information that the system needs to make decisions when implementing the transport arrangement service. The service application on each client device 102 can, for example, disable an ability of users to switch off the client device's position determination resources (e.g., GPS) when the service application 112 is executing, as well as to significantly interfere with the client device's communications over an established channel with the transport arrangement system 100.

In some examples, the servers 101 implement functionality, shown as being provided by transport pooling logic 105, to arrange transport pooling services, as well as to determine predictive outcomes for actual (e.g., two riders in one vehicle), prospective (hypothetical placement of actual rider who has not been assigned to a driver with existing transport which can accommodate the rider for rider pool), and/or hypothetical pool (e.g., when rider pools are determined from statistical data indicating likelihood of available vehicles given projected supply/demand). Additionally, the transport pooling logic 105 can utilize information from multiple users (including drivers and riders) to determine multiple facets of a requested or prospective (or hypothetical) rider pairing. The client devices 102R, 102D can utilize the communication network 104 to repeatedly or continuously communicate information such as position information 109R, 109D and/or service status information 119R, 119D. In examples, the client devices 102R, 102D execute variations of the service application 112, which provides functionality that enables the formation and/or maintenance of a communication channel between the respective client device and the network service. Additionally, service application 112 can implement processes or functionality to access hardware (e.g., GPS, accelerometer, etc.), software or data resources (e.g., maps) of the respective devices for purpose of obtaining raw data (e.g., position information from sensors such as GPS) for use in providing information (e.g., position information 109R, 109D, service status information 119R, 119D) which the transport pooling logic 105 can use to make predictive outcomes of projected completion times and/or vehicle occupancy.

As mentioned with other examples, the service application 112 can implement functionality to limit or eliminate users from interfering with the acquisition of raw data, as well as the manner in which the raw data is processed before being communicated to the transport arrangement system 100. For example, the service application 112 can implement an automated process to scan position sensors and determine geographical coordinates of the device at the particular instance, then pair the information with an account identifier, and further encrypt (or hash) the information before transmission to the transport arrangement system 100. If the user should disable, for example, the GPS functionality, the service application 112 can disable receipt of services for the device, or alternatively limit service provided to the user while discounting information communicated from the device. In this way, the service application 112 implements functionality to protect the accuracy and integrity of information communicated from the respective client devices 102R, 102D.

FIG. 2A illustrates an example of a transport arrangement service for arranging rider pools. A transport arrangement service 200 can be implemented as part of, for example, a transport arrangement system 100, such as described with an example of FIG. 1. Accordingly, an example of FIG. 2 can be viewed in context of the transport arrangement system 100 of an example of FIG. 1.

With reference to an example of FIG. 2A, the transport arrangement service 200 can be implemented using a server (or combination of servers or other network computers). In one implementation, the service 200 includes processor 201, memory 202 which can include a read-only memory (ROM) as well as a random access memory (RAM) or other dynamic storage device, a display device 203, an input mechanism 204 and a communication interface 205 for communicative coupling to a communication network 214.

The processor 201 of the service 200 performs one or more processes, steps and other functions described with implementations such as described by FIGS. 1, 2A, 3, 4A, 4B, 5A and 5B. The processor 201 can process information and instructions stored in memory 202, such as provided by a random access memory (RAM) or other dynamic storage device, for storing information and instructions which are executable by processor 201. The memory 202 can be used to store temporary variables or other intermediate information during execution of transport pooling logic 105 and other logic. The memory 202 can include ROM or other static storage device for storing static information and instructions for processor 201. The communication interface 205 can operate to enable the transport arrangement service 200 to communicate with one or more communication networks 214 (e.g., cellular network) through use of the network link (wireless or wired). Using the network link, the service 200 can communicate with one or more computing devices in supplying providing. In accordance with examples, shared transport server 101 communicates with, and receives information including in-transit or on-trip location information while a shared ride pool that is provided by the transport arrangement system 100 is when a ride pool is evaluated (e.g., by rider), initiated or in progress.

Figure 5A:
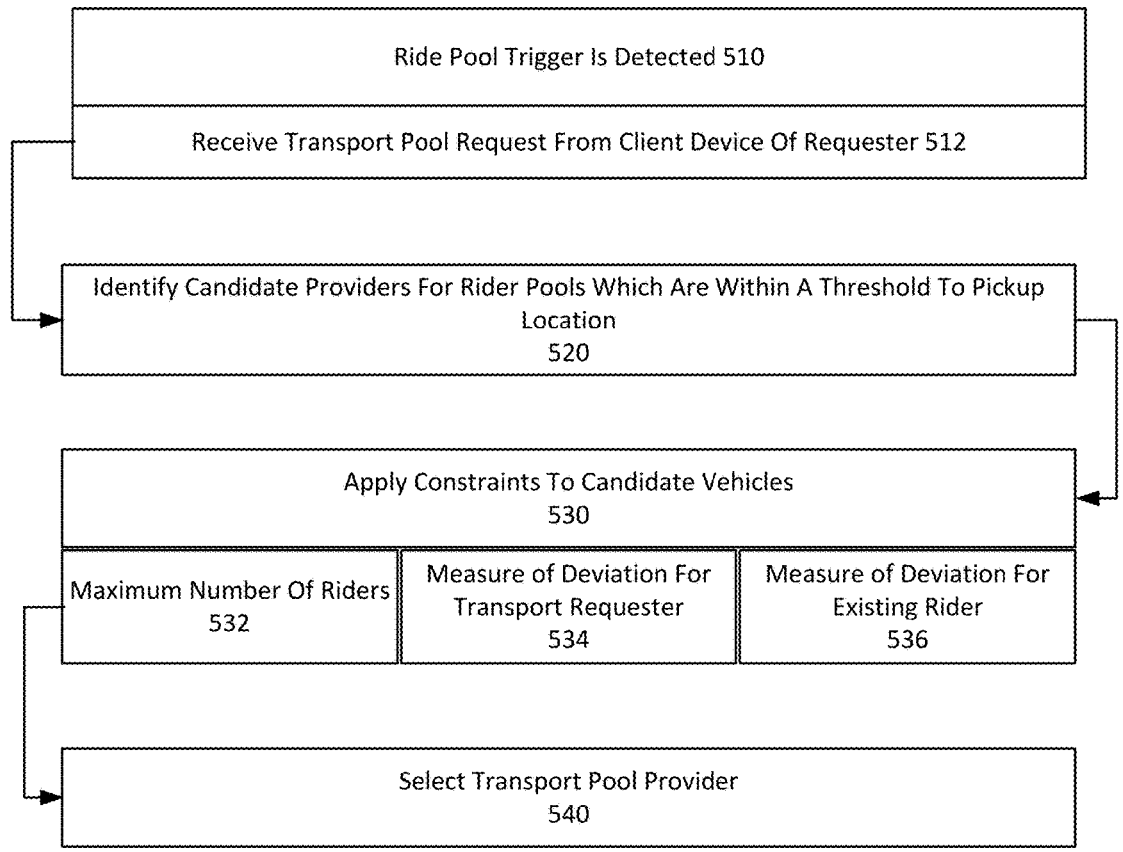
FIG. 5A illustrates an example method for matching a transport pool provider to a transport pool request.
Figure 5B:
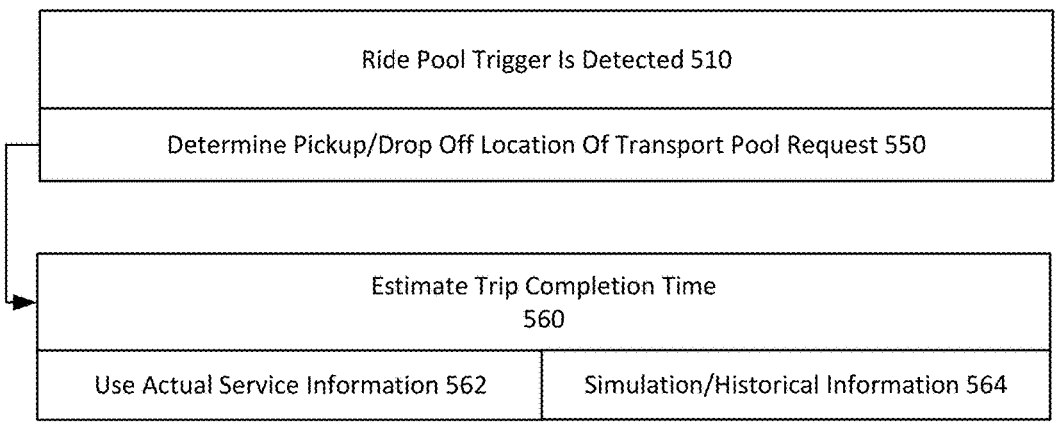
FIG. 5B illustrates an example method for predicting a trip completion time for a given trip.

The processor 201 can execute instructions from memory, as shown by transport pooling logic 105, to provide rider pool matching (e.g., see FIG. 5A), as well as predictive outcomes for actual, prospective and/or hypothetical rider pools (e.g., predictive trip completion time, such as described with an example of FIG. 5B). The transport pooling logic 105 can include a ride pool matching component (e.g., as described with FIG. 5A), as well as trip completion time predictor 227 (e.g., as can be implemented with an example of FIG. 5B). A set of ride pool constraints 229 can be stored for use with the ride pool matching component 225 and trip completion time predictor 227. The ride pool constraints 229 can include, for example, (i) a maximum number of passengers which are permitted for a given vehicle under consideration for a ride pool, and/or (ii) a permitted deviation for accommodating the requester as an additional rider of an existing ride pool in progress, from the perspective or the additional rider (where the deviation is compared to a transport to the requester's drop-off location without a ride pool transport), and/or existing rider (where the deviation is compared to the in progress transport for the existing rider being completed without the additional rider).

In one implementation, the processor 201 can process a ride pool request to determine parameters such as pickup location and drop-off location for a rider's request. The processor 201 can execute the ride pool matching component 225, which can utilize the parameters of the ride pool request to select a ride pool for the requester, subject to the constraints 229. As described in other examples the constraints 229 can be determined from historical information, and can be specific to time interval (e.g., day of week, time of day) and geographic region. In a variation, the constraints 229 can enable ranking or scoring, so that the selected vehicle may be one that best satisfies the constraints 229 (e.g., vehicle with least deviation). Additionally, the processor 201 can execute the trip completion time predictor 227 to predict a trip completion time for a selected or considered ride pool, given the parameters of the request.

Figure 2B:
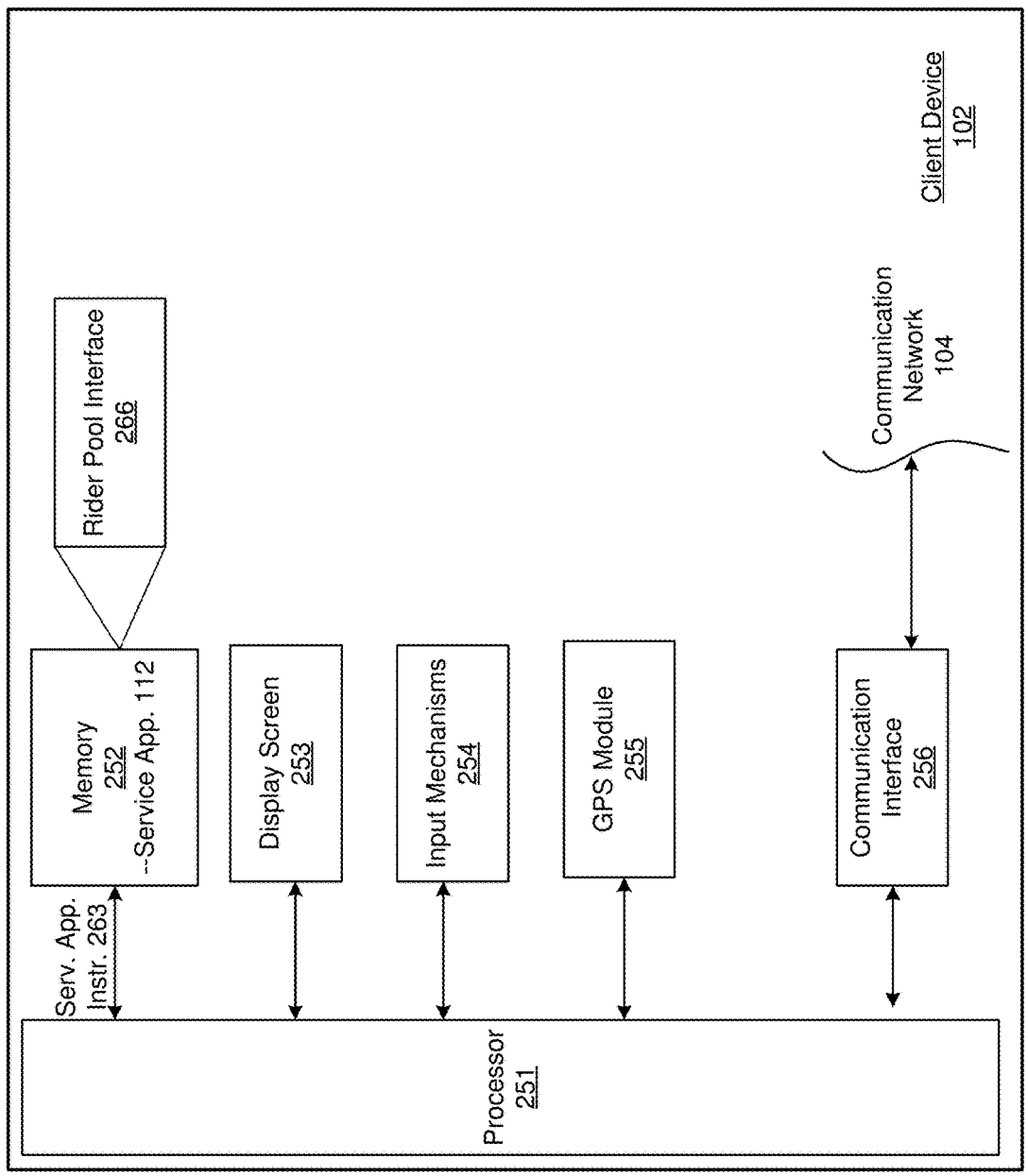
FIG. 2B illustrates an example mobile computing device for use with a transport arrangement system.

FIG. 2B illustrates an example mobile computing device for use with a transport arrangement system. In an example of FIG. 2B, a mobile computing device 250 can execute the service application 112 in order to operate as one of the client devices 102 (see FIG. 1) of a transport arrangement system. Accordingly, the mobile computing device 250 can correspond to, for example, a cellular communication device (e.g., feature phone, smartphone etc.) that is capable of telephony, messaging, and/or data services. In variations, the mobile computing device 250 can correspond to, for example, a tablet or wearable computing device. The mobile computing device 250 includes one or more processors 251, memory 252, display screen 253, input mechanisms 254 such as a keyboard or software-implemented touchscreen input functionality, location determination capability such as by way of a GPS module 255, and one or more communication interfaces 256 (e.g., interfaces for enabling wireless communications using Wi-Fi, Bluetooth, cellular mediums) for communicatively coupling to communication network 264 (e.g., such as by sending or receiving cellular data over data and/or voice channels) in order to communicate with transport arrangement service 200.

According to some examples, the service application 112 can be executed to generate one or more interfaces for interacting with the transport arrangement service 200. In an example of FIG. 2B, the service application 112 can be implemented using application instructions 263 in order to generate rider pool interface 266 from which transport pool requests can be generated by rider class users. The service application 112 can be downloaded (via communication interface 256) from a website controlled by the transport arrangement system 100. As described with an example of FIG. 5A, the rider pool interface 266 can be used to match a rider with a ride pool transport provider. Still further, as described with an example of FIG. 5B, the rider pool interface 266 can be used to estimate a time of arrival for a prospective or actual rider of rider pool.

According to some examples, the rider pool interface 266 can enable a rider class user to operate the mobile computing device 250 as a client device 102 for purpose of requesting a ride pool transport from the transport arrangement service 200. In making the transport request, the service application 112 can execute to access the GPS module 255 to determine a current location of the user. The service application 112 can provide or access a map or other location based interface in order to enable the user to specify the pickup location (e.g., as the current location or position relative to the current position) and drop off location. The transport arrangement service 200 can receive and respond to the transport pooling request, so that content (e.g., location of approaching vehicle) can be rendered on the display screen 253. The user can interact and specify input (e.g., make transport pool request, specify drop-off and destination locations, etc.) using one or more of the input mechanisms (e.g., touch screen).

Figure 3:
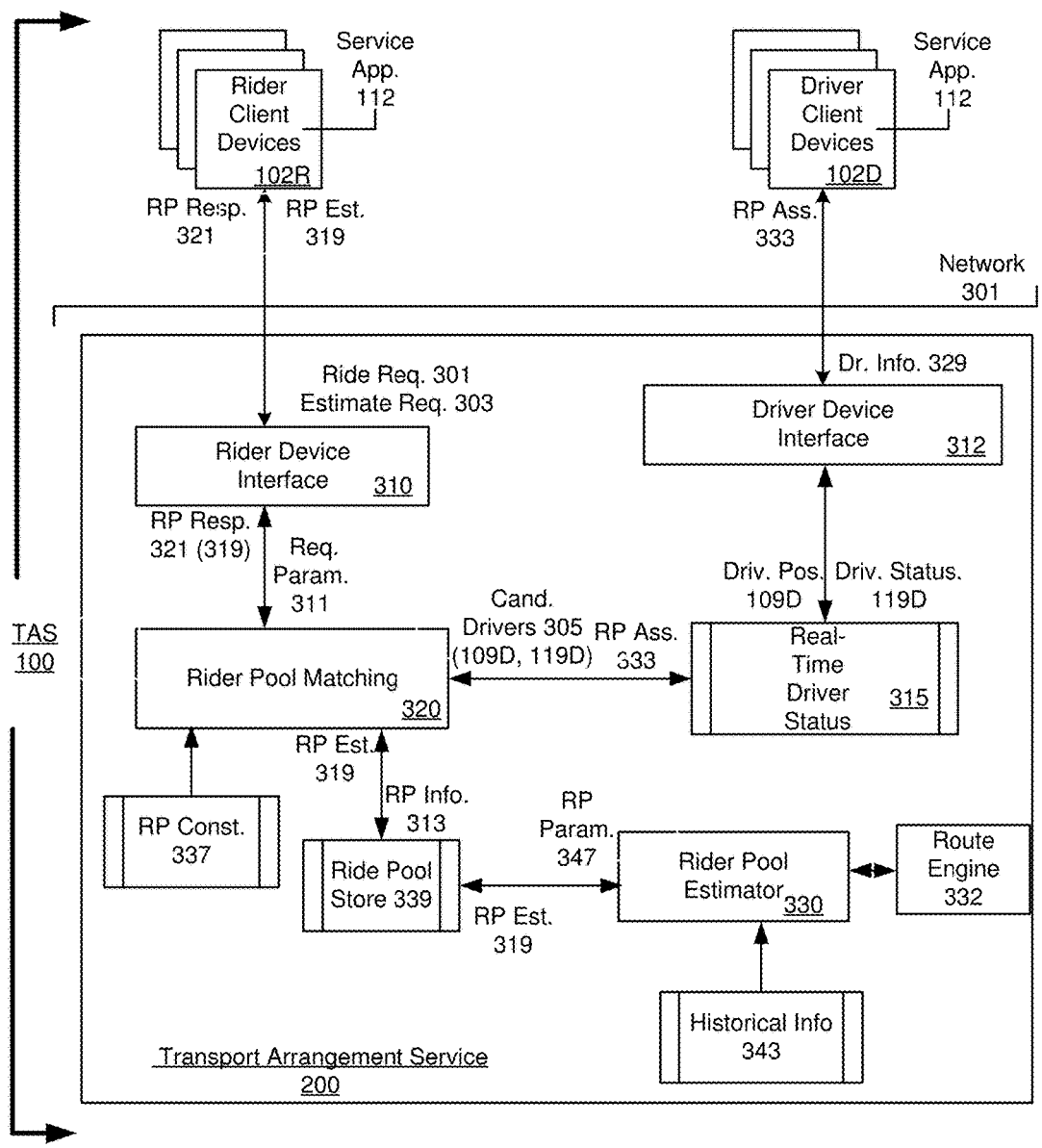
FIG. 3 illustrates a logical architecture of a transport arrangement system, according to one or more embodiments.

FIG. 3 illustrates a logical architecture of a transport arrangement system, according to one or more embodiments. More specifically, FIG. 3 illustrates logical or programmatic components or functionality that can be combined to implement example transport arrangement system 100 (see FIG. 1), including components of client devices 102R, 102D for riders and drivers, as well as the transport arrangement service 200 for use with such client devices.

As described with examples of FIG. 1, 2A and 2B, rider client devices 102R execute service applications 112 in order to communicate and receive services from the transport arrangement service 200. In particular, the client devices 102R can execute service application 112 to open or maintain a communication channel with the transport arrangement service 200 via a rider device interface 310. While different types of communications can be exchanged for different services and functionality, an example of FIG. 3 provides that the rider client devices 102R communicate ride pool requests 301 (alternatively referred to as "transport pool requests" or similar variations) and estimate requests 303 of a corresponding rider. The ride pool requests 301 can correspond to a request from the rider to receive a transport pooling service from a pickup location to a drop off location. The estimate request 303 can correspond to a manual or programmatically generated request to estimate an attribute or parameter of a transport pool service specifically related to trip duration, such as trip completion time. The trip completion time can refer to the time needed from when the rider is picked up at a pickup location to the time when the same rider is dropped off at the drop-off location. For example, the rider can operate client device 102R in order to receive an estimate for the duration of a ride pool, in advance of the rider deciding to make the ride pool request 301. Alternatively, the client device 102R can respond to user input to estimate the attribute or parameter of a ride pool that has just been initiated (e.g., rider enters vehicle) or is otherwise in progress for the requesting user.

In other variations, a programmatic component or element of client device 102R or transport arrangement service 200 can be triggered to generate the estimate request 303. For example, upon the rider receiving a response 321 to a ride pool request 301 (e.g., user is informed that a vehicle is on route to pick up the rider), a programmatic element of the client device 102R and/or transport arrangement service 200 automatically generates the estimate request 303, and the request can be repeated for updated information. While many examples consider deviations or modifications to trip completion time when describing a response to the estimate request 303, variations can consider other attributes of a rider's trip, such as modification to trip by distance, fare price (which may be dependent on trip completion time or distance), and/or fare comparison (as between rider pool and singular transport) given the rider's pickup and drop-off locations.

The driver client devices 102D each execute a corresponding version of service application 112 when the drivers are active. The service application 112 on the driver client devices 102D can establish and maintain a communication link with a driver device interface 312 of the transport arrangement service 200, and the communication link can be used to communicate various types of information, shown as driver information 329, to the transport arrangement service 200. According to some examples, the driver information 329 can include driver position information 109, driver status information 119 and/or other information such as driver (or vehicle) identifier. The driver device interface 312 can include logic to maintain a real-time driver status store 315 for use by various components of the transport arrangement service 200. In particular, the driver device interface 312 can be updated continuously, by the driver information 329 that is communicated from each driver client device 102D, so that the driver position information 109D and driver status information 119 is maintained up-to-date. The driver status information 119D can reflect whether the driver is active or inactive, and whether the driver is on a trip or available to provide service for a new requester. In the context of rider pooling, the driver status information 119D can reflect whether the driver has an existing passenger and/or whether the driver has room for a new rider. Additionally, the driver status information 319D can include drop-off location for the trip(s) which a given driver is on.

In some variations, the driver status information 119D can reflect whether the driver is on a trip, when the driver has been assigned to a rider (but before the trip has begun) or when the driver is nearing completion of a trip. Depending on implementation, recent driver assignment (e.g., less than two minutes after assignment) can be considered as an available status. Likewise, a driver who is nearing completion of a trip can also be considered available when the time of completion is within a given threshold.

According to examples, the transport arrangement service 200 implements functionality to match a rider with a ride pool transport. The ride pool transport can correspond to an arranged transport that can be pooled for multiple passengers. From the perspective of a requester (e.g., user who generates ride pool request 301), the ride pool transport can be correspond to a transport in which the requester will either be a first or sole rider, or alternatively, a transport in which the requester will be an additional rider. According to examples, a requester will not know whether the provided transport will have an existing rider or be empty. Moreover, the requester will not know how the status of the transport will change over time (e.g., with the addition of a new rider, drop off of an existing rider, etc.).

An example of FIG. 3 recognizes that the uncertainty can dissuade riders from wanting to request a ride pool transport. For example, from the perspective of the requester, a ride pool transport can take a longer period of time in order to accommodate additional pickup and/or drop-offs. In order to provide more certainty, the transport arrangement service 200 can estimate and/or firmly limit the range of a trip completion time for any particular ride pool transport. In one implementation, ride pool matching component 320 selects a ride pool transport for an incoming ride pool request 301, with a set of ride pool constraints 337 defining upper limits of added time or distance for the ride pool transport, from the perspective of either the requester or existing passenger. In some examples, the set of ride pool constraints 337 include identification of a maximum number of passengers that drivers are permitted to carry (e.g., two or more). The maximum number of passengers can, for example, be based on a size of the driver's vehicle, a preference of an operator of the transport arrangement service 200, and/or a preference of driver/operator of individual vehicles used by the transport arrangement service 200. Still further, the set of ride pool constraints 337 can include permitted deviations from an existing or optimal trip as measured in distance and/or time. In some examples, the deviations can be determined in context of the requester, so as to reflect a measure of added time or distance that is or may be needed for transporting the requester to the requester's drop off location as compared to transporting the requester between the pickup and drop-off locations without rider pooling (e.g., singular rider transport). As an addition or alternative, some variations provide for the deviations to be a measure of extension to an existing rider's trip in terms of duration and/or time as a result of the addition of the requester as a new rider. In this way the rider pool constraints 337 can define limits or thresholds for when deviations are acceptable in matching a ride pool transport to a ride pool request.

According to an example of FIG. 3, when the set of candidate drivers 305 are identified, a ride pool estimate 330 can be used to calculate a ride pool estimate 319, corresponding to a trip completion time and/or a trip completion distance. The trip completion time and/or distance can be predicted based on a determined best-case (e.g., rider in rider pool with no other riders) and/or worst-case scenario (e.g., rider in rider pool with maximum passengers), average of best/worst case scenarios, or variations thereof. In some variations, the ride pool estimate 330 can calculate trip arrival times for the requester, based on, for example, best case scenario (e.g., requester receives single rider transport), worst case scenario (e.g., requester receives rider pool transport), and/or probability thereof. The trip arrival times can also be expressed in terms of the range (e.g., as between best and worst case scenarios), using the routing engine 332 to determine time and/or distance traveled for the requester's trip. As described with an example of FIG. 5B, arrival times can be estimated for a requester even when uncertainty exists as to whether the transport provided to the requester will accommodate multiple passengers, or the amount of route modification and time extension which will be present if the transport provided to the rider is in fact pooled either before or after the rider transport request is made.

In order to determine the ride pool estimate 319 for trip arrival time or distance, the ride pool estimator 330 can use the historical information 343 to determine, for example, (i) supply, (ii) demand, (iii) a probability of multiple passengers in one vehicle, and/or (iv) a probability that if a requester initiates a transport in an empty vehicle, another rider pool request may be received during the trip so as to convert the trip to a rider pool. Still further, the historical information 343 can include typical deviations by time or duration for a given geographic region and/or relevant time period. The ride pool estimate 319 can also include consideration of multiple ride pool pairings occurring in one trip for the requester, using input of supply, demand, and/or historical information. For example, if the requester's trip is relatively long, the ride pool estimate 319 can consider a probability that the user's ride pool will include a drop-off of an existing rider and a new pickup of a new rider, or multiple drop-offs and/or new pickups before the requester is transported to the drop-off location.

In some implementations, the ride pool estimator 330 operates the routing engine 332 to reroute an in-progress trip for purpose of accommodating an additional rider. Trips which are in progress by candidate drivers can be analyzed for route modifications in order to determine an extension or deviation to trip completion time or distance. More specifically, a candidate driver with an existing passenger can be evaluated for the ride pool request 301 by determining the extension in time or distance caused by the addition of the requester to the existing trip. The ride pool estimator 330 determines a modification or extension to the existing trip of the driver using the routing engine 332. The routing engine 332 determines one or more alternative routes (or route modifications) for the existing trip of the driver, in order to accommodate a trip of the requester. The routing engine 332 can also be used to calculate a predicted or likely modified route of the driver when the requester is picked up, as compared to a single rider trip for the requester.

When the vehicle of a candidate driver has no existing passengers, the ride pool estimate 330 can determine a possible extension for a trip that is initiated for the requester as a single rider. The possible extension can consider a probability that another rider will be picked up while the requester's trip is in progress, so that the requester's trip completion time or overall distance may be extended as a result of a subsequent pickup. In some variations, the probability can be determined from historical information 343. Still further, rather than probability, the ride pool estimate 330 can assume a reasonable worst-case scenario, such as the requester being joined by a new rider at a point in the trip where the extension is maximized by time or duration. Similarly, in some examples, the estimate can be determined from statistical or probability analysis of the historical information 343.

In some variations, the historical information 343 can be used to determine some or all of the ride pool constraints 337. For example, the permissible deviations as to time or distance can be determined from averaging prior data and/or performing statistical analysis on trip completion times or distances for rider pool transports in a given geographic region and/or interval of time.

Depending on variations, the ride pool constraints 337 can be static (e.g., fixed at 5 minutes in terms of extensions permitted to existing rider, or in terms of additional time for requester as compared to single rider transport), dynamic (e.g., subject to change based on events such as traffic conditions, and/or supply or demand), or formulistic. Still further, some examples enable users (e.g., riders) to specify constraints 337, such as when making the transport pool request 301. For example, the rider can specify a request for a transport pool request, provided that the added time for the transport pool does not exceed a set number of minutes, as compared to a singular transport service.

According to some examples, when an incoming rider transport request 301 is received, the rider pool matching component 320 combines with the ride pool estimate 330 in order to select a driver for the transport request. In one implementation, the rider pool matching component 320 uses the request parameters 311 (e.g., pickup and drop-off locations) to select a suitable ride pool transport for the request. In an example of FIG. 3, the rider pool matching component 320 queries the real-time driver status store 315 to obtain a candidate set of drivers 305. The candidate set of drivers 305 can include those drivers which are available (based on driver status information 119) and whom are within a threshold proximity to the requester or pickup location (based on driver position 309).

To further the example, in determining which of the drivers in the candidate set 305 satisfy the rider pool constraints 337, the rider pool matching component 320 can utilize one or more rider pool estimates 319 provided by the ride pool estimator 330. In one implementation, the rider pool information 313 for a given ride pool requester 301 is stored in the ride pool store 339 for determination of ride pool estimates 319 (e.g., predicted trip completion time, worst-case trip completion time, etc.). According to some examples, the ride pool store 339 can reflect the prospective or hypothetical ride pool transports, rather than actual ride pool transports. The prospective or hypothetical ride pool transports can be used to calculate, for example, time or distance deviations presented by each driver of the candidate set 305, should that driver be selected to provide the ride pool transport for the requester. The deviations needed in time or distance to accommodate the requester may be used to weight, rank or otherwise select one vehicle of the candidate set 305 over another.

The ride pool information 313 can specify ride pool parameters 347, including pickup and drop-off locations for the requester's trip, as well as information about the candidate drivers 305 (e.g., current position and/or destination, planned route for trip, etc.). The ride pool estimate 330 can access the routing engine 332, in order to determine optimal modifications to existing or planned routes of active trips that are in progress for the candidate drivers 305. Some examples provide that for at least some of the candidate drivers 305, a modification or deviation to an existing and active route is used to determine the time extension for the addition of another rider (e.g., the requester). In other examples, the routing engine 332 can be used to determine a likely route for a given transport request 301 for a single rider transport. Historical information 343 can be used to determine a probability that the requester' trip will convert into a pool, subject to the constraints 337. Alternatively, an assumption can be made at the request's trip will be converted into the rider pool. In either case, an alternative route can be predicted if the requester's trip is turned into a rider pool, and the alternative route can be used to determine an extension in time or distance for the requester's trip should the rider pool occur after the requester's trip is initiated.

In one implementation, rider pool matching component 320 implements a process to determine which of the candidate set of drivers 305 best satisfy the rider pool constraints 337. For example, if multiple drivers satisfy the constraints 337, the additional selection criteria can be used. Examples of additional selection criteria can include (i) driver with lowest time to a pickup location specified by the ride pool request 301, (ii) driver which can provider rider pool transport with smallest extension in time or distance to either requester or existing rider, and/or (iii) the driver who is most likely to offer the requester a longest duration of solitary time for a ride pool that is within time/distance constraints.

As an alternative or variation, the rider pool matching component 320 and ride pool estimate 330 combine to implement a process to rank or weight drivers of the candidate set 305 based on one or more constraints 337. By way of example, for the latter case, if multiple drivers satisfy all of the rider pool constraints 337, then additional selection criteria determined from the rider pool constraints 337 can be used to select the driver for the transport request 301. According to some examples, the selected driver can correspond to a driver who has at least one rider in the vehicle, for whom the existing trip presents the least amount of conflict in terms of added time or distance for the rider pool transports of the requester or existing passenger. Thus, for example, the selected driver for the requester can correspond to the driver who is on a trip to the same drop off as that specified by the requester. Still further, in other variations, the selection of the particular driver can be based on factors such as minimizing an arrival time for a driver to arrive at a pickup location specified by the ride pool request 301.

Still further, an example of FIG. 3 provides that the rider pool matching component 320 implements a selection process such as described with one or more examples of FIG. 5A. When the driver is selected from the candidate set 305, a rider pool assignment 333 can be communicated to the real-time driver status store 315. In one implementation, the rider pool assignment 333 links a record of the driver to a newly assigned rider pool transport, identifying a new pickup location, updating a number of passengers in the rider's vehicle, and adding or identifying the drop off location for the newly added rider pool transport. The ride pool store 339 can also represent an instance of pertinent real-time records reflecting rider pool assignments for individual drivers in a given geographical region, and at a particular moment in time.

Figures 4A, 4B:
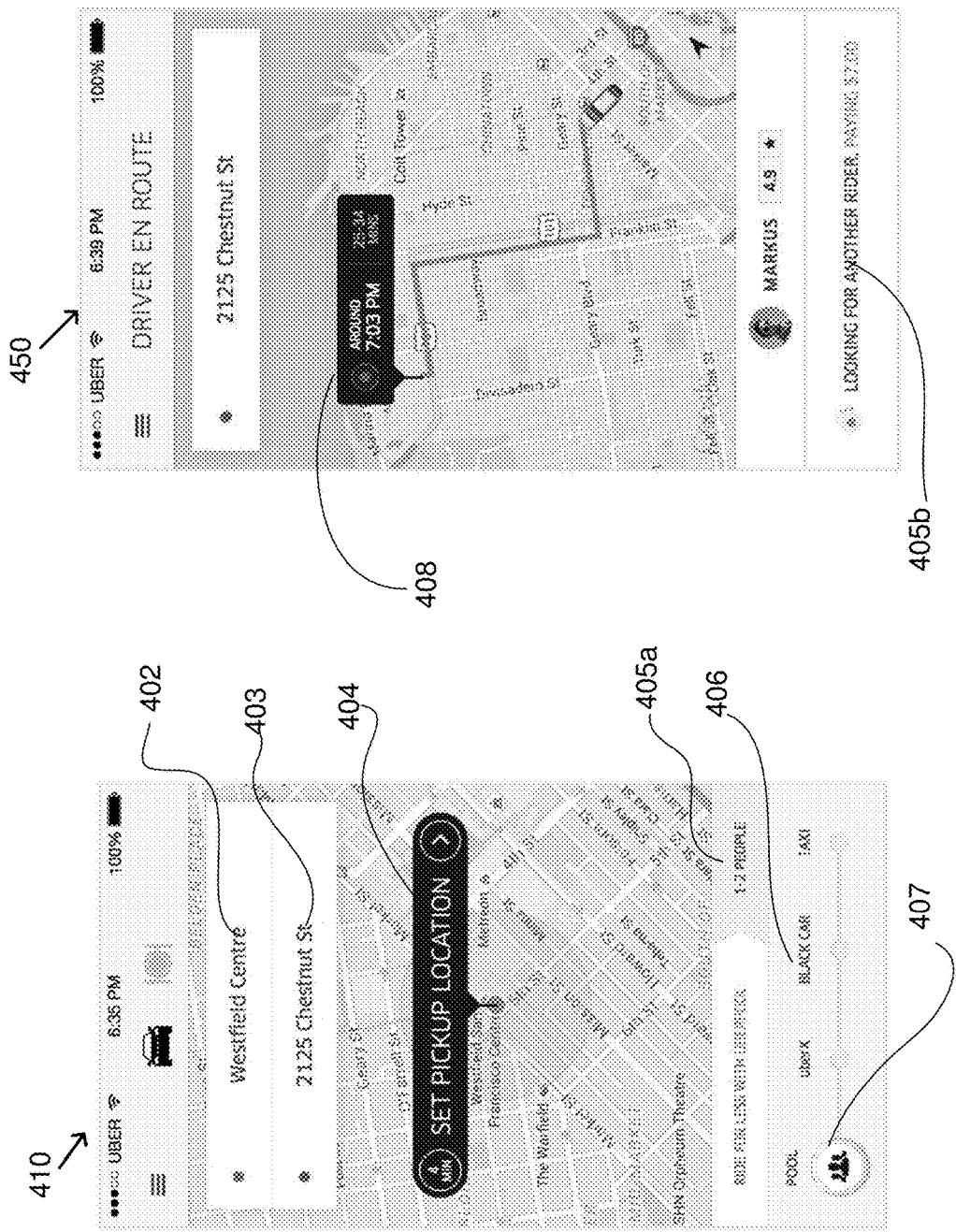
FIG. 4A and FIG. 4B illustrate example interfaces for providing a pooled transport service.

FIG. 4A and FIG. 4B illustrate example interfaces for providing a pooled transport service. According to various implementations, a transport request interface 410 (FIG. 4A) and ride pool interface 450 (FIG. 4B) can be provided on a mobile computing device (such as described with an example of FIG. 2B), using data communicated from a network service (such as described with an example of FIG. 2A).

In an example of FIG. 4A, a transport request interface 410 is provided on a client device 102 as part of, or generated with, execution of the service application 112. In one example, transport request interface 410 enables an individual to make a selection of a transport service using a selection mechanism 406. The offered transport services can include a ride pool service 407, as well as other types or levels of service.

In making the selection, the user can specify the pickup location 402 and the drop-off location 403. A user can, for example, use a feature 404 to trigger a transport request using either the specified pickup location 402, which in many cases can be the user's current location. In an example shown, the transport request is not initiated until the user makes a selection through the feature 404. Prior to the feature 404 being selected, the request interface 410 can include service specific information 405a. For a ride pool service, the service specific-information 405a can identify a maximum number of persons which may ride in a given ride pool provided through the transport arrangement service at that time.

In an example of FIG. 4B, the ride pool interface 450 can include a trip completion time predictor 408 for when the ride pool transport service is selected or requested. The trip completion time predictor 408 can be determined from, for example, the destination location 403, using a process such as described with an example of FIG. 5B. According to some examples, the trip completion time predictor 408 can be displayed (i) before when the user makes the transport request (e.g., through the ride request interface 410), (ii) after the user makes an initial ride pool request using, for example, the feature 404 of the transport request interface 410, but before confirming the ride pool request, (iii) after the user makes the initial ride pool request using, for example, the feature 404 of the transport request interface 410 and after the user confirms the ride pool request, but before the transport has arrived to the pickup location, and/or (iv) once the user is on-trip using a ride pool transport (e.g., the user has entered the vehicle and the driver has started the transport service).

In examples in which the trip completion time predictor 408 is provided on a user interface before the pickup arrives, the value of the trip completion time predictor 408 can be calculated based on a trip completion time for a ride pool, as described with an example of FIG. 5B, plus an estimated time to pickup for a suitable ride pool vehicle. In some examples, historical information is used to determine the time to pickup for the suitable ride pool vehicle, so that the trip completion time predictor 408 displays the sum of the estimated time to pickup and the trip completion time for when the ride pool starts.

While transport pool services can provide lower fares for transport for a user, as well as provide more efficiency for the driver, ride pools can take more time to deliver the passenger to the desired drop-off location. In this regard, under conventional approaches, a ride pool service can become an unattractive selection because the ride pool service presents an unknown to the rider as to completion time for a given trip. Examples recognize that if the rider is unaware of the ride pool constraints, specifically the trip completion time, the uncertainty may cause the rider to choose singular transport even though the ride pool would have delivered the rider to the drop-off within a time frame that would have been acceptable.

In contrast to conventional approaches, examples of FIG. 4A and FIG. 4B enable a user to have predictability as to trip completion time when a ride pool service is requested. The trip completion time predictor 408 can, for example, display any one of the following types of information for the rider before the rider commits to making a transport request: (i) trip completion time for ride pool; (ii) range of trip completion times with worst-case scenario being highly reliable or guaranteed (e.g., twenty five to thirty four minutes); (iii) trip arrival time, with consideration of time to pick up for a driver of the rider pool and the trip completion time, including range and/or worst-case; and/or (iv) differentials in time as between alternatives of ride pool or other types of arranged transport, including singular transport, for both arrival time and trip completion time. In some variations, the completion or arrival times can also be correlated to price information, so that the trip completion time predictor 408 can provide a comparison of information such as trip arrival time, fare price, type of vehicle.

While examples of FIG. 4A and 4B illustrate the trip completion time predictor 408 for an interface that is displayed after the ride request is made, variations provide that the trip completion time predictor 408 can be displayed on alternative interfaces, including those displayed to the user before the transport request is made. In such variations, the trip completion time predictor 408 can include information based on prospective rider-driver pairing (e.g., user is hypothetically paired with a likely driver who would receive the transport request for purpose of calculating values for the trip completion time predictor 408) or hypothetical rider-driver pairings (e.g., based on historical information and probabilities, without consideration of actual driver who may receive pairing).

Methodology

FIG. 5A illustrates an example method for matching a transport pool provider to a transport pool request. 5B illustrates an example method for predicting a trip completion time for a given trip. According to some aspects, examples of FIGS. 5A and 5B can be implemented as part of a transport arrangement system 100, such as through use of the service 200 and/or in connection with client devices 102. Furthermore, in describing examples of FIGS. 5A and FIG. 5B, reference is made to examples of FIGS. 1 through 4B for purpose of illustrating suitable components or elements for performing a step or sub-step being described.

In an example of FIG. 5A, a ride pool trigger is detected (510). The ride pool trigger can correspond to a transport pool request generated from a client device 102 of the rider (512). The ride pool trigger can include one or more parameters, such as a pickup location for where a transport for a rider is to start, a current location of the requester, and/or a drop-off location for the transport.

In response to the trigger, the transport arrangement system 100 selects a transport provider (e.g., driver-class user). The decision can be implemented as part of a multi-decision sequence (e.g., sequenced or iterative process). In one implementation, the transport arrangement system 100 identifies a set of candidate drivers 305 for rider pools which are within a threshold to the pickup location (520). The threshold can correspond to a predetermined distance or a duration of time for a given vehicle to arrive at the pickup location.

The candidate set of providers can be subjected to one or more filtering or weighting processes from which one or more selections of providers is made. The processes can include application of a set of constraints to individual vehicles which meet the distance or time threshold (530). The constraints 337 can be implemented as rules or conditions relating to the suitability of a particular vehicle to provide a ride pool transport for a passenger of the transport trigger. In one example, the set of constraints for determining the suitability of a provider from the candidate set include (i) a number of riders which can be transported in one vehicle, as compared to the actual number of riders (532); (ii) a measure of deviation (e.g., by distance or time) which the provider would need to take to accommodate the rider of the transport trigger (534); (iii) a measure of deviation (e.g., by distance or time) which the transport requestor would need to make to accommodate the rider of the transport trigger (536), as compared to the route which would otherwise be taken based on a planned or existing trip of the particular provider in arriving at the pickup location of the transport trigger.

In some examples, the application of constraints is determinative. For example, the constraints can filter out providers from the candidate set. In variations, the application of some or all of the constraints can weight providers in favor or against selection. For example, implementation of the some or all of the constraints can be quantified to reflect a score or set of parametric values from which individual providers can be matched to the transport request.

In more detail, application of the constraint under each of (532), (534) and (536) can include variations. When application of the constraint under (532) is implemented determinatively, the transport arrangement system 100 can filter out drivers from the candidate set whom are on trips and have a maximum number of passengers. For example, in some examples, a constraint may limit vehicles of providers to carrying two riders, in which case those providers of the set whom have two riders at the time the trigger is received are eliminated from the candidate set. In variations, the constraint for the maximum number of riders may exceed two (e.g., for larger vehicles such as SUVs), and the number of passengers which are present in the vehicle of a provider under consideration can translate to a desirability or result. For example, a vehicle that can accommodate three riders and have two present when considered for a trans port request may score lower (or against selection) than a comparable vehicle with no riders present.

In some examples, the deviations (534) and/or (536) can be determined for transport providers of the set whom carry at least one rider and whom have room for another rider (532). In variations, the deviations can be calculated for transport providers of the set whom have availability for riders (e.g., no riders present when maximum number of riders is two), based on a prediction that another rider will pool in the vehicle. In the latter case, the deviations represent predictive parameters.

In determining the deviations for a particular transport provider under either (534) or (536) (under assumption that one or more riders are present in the vehicle of a transport provider in the candidate set when trigger is received), the transport arrangement system 100 can determine an alternative route which would provide the least amount of deviation from an existing route of candidate vehicle, while accommodating the drop-off locations of the existing riders and also the parameters of the transport request (e.g., pickup and drop-off location). According to some examples, the routing engine 332 can determine a modified route for vehicles of providers in the candidate set. The routing engine 332 can determine the modified route based on route planning constraints, such that the modified route partially subsumes, or overlaps with, an existing route of the vehicle in the candidate set. In one implementation, a modified trip completion time and/or a distance in deviation are determined for one or more existing riders of the vehicle under consideration. As an addition or alternative, a trip completion time and a distance in deviation can be determined for the transport request, based on the parameters associated with the transport request, and the deviation in trip completion time and/or distance can be compared to an optimal time.

The determinations of (532), (534) and/or (536) can be used to select a provider for the transport pool request (540). Based on implementations, the determinations can filter out drivers from the candidate set, rank drivers of the candidate set, and/or weight selection scores for individual drivers of the candidate set. For example, those drivers of the candidate set who do not satisfy the constraints of time or duration for their existing respective rider may be eliminated from the candidate set. The selection process can use the ranking or score, along with other aspects such as proximity or trip completion time for a driver to arrive to the pickup location.

With reference to FIG. 5B, the ride pool trigger is detected (510), such as from a transport pool request with parameters that specify a pickup and drop-off location (550). An estimated trip completion time can be determined for the transport request (560). As described in various examples, the estimated trip completion time can have various forms, including any one of (i) a best case (e.g., rider pool has no other riders), (ii) worst case (e.g., rider pool is at maximum with inclusion of new rider, (iii) range of best and worst case trip completion times, and/or (iv) average of best and worst case times. In a context of determining trip completion time, the ride pool trigger can correspond to a request generated from the requester, as either a part of a transport pool request or independent of the corresponding request (e.g., rider requests estimated trip completion time for rider pool service before electing to make the request for rider pool service). Still further, the ride pool trigger can correspond to a driver being assigned or selected for the requester, such that the estimated trip completion time or range is displayed to the user.

In one implementation, the estimated trip completion time is determined using actual service information, such as provided through driver position information 109D and service state information 119D of drivers in a given region (562). In variations, the estimated trip completion time can be determined from a simulated selection process, including a process that makes the selection based on ride pool supply information and/or historical information 343 (564).

With respect to a simulated selection process, in some implementations, if the prospective driver has less than the maximum number of riders after the addition of the requester, the trip completion time can include consideration of a worst-case scenario in which a prospective additional rider (or riders) is added in context of application of constraints (532)-(536). Examples recognize that in ride pooling, the application of constraints may generate different outcomes based on factors such as when the additional rider is added on the route planned for the requester. In some examples, historical information 343 can be used to predict (i) a likelihood that another rider will be added to a trip of the requester, and/or (ii) an impact of another rider to the trip of the requester (e.g., amount of time and/or distance needed for a modified route to accommodate the new rider).

As an alternative or variation, the worst-case can use historical information 343 and/or worst possible next pickup in determining at least a portion of the trip completion time. The historical data can be specific to a geographic region (e.g., city), or to a locality within a geographic region (e.g., downtown portion of city) or even to a city block. The historical information 343 can take into account ride pooling metrics for the geographic region or locality, such as the number of ride pools, the number of riders per ride pool, and/or the typical deviation for individual ride pools. More generally, the historical information can reflect the supply (including the supply of ride pools) and the demand. In variations, the historical information can also be correlated to day of week, time of day, or other parameter.

Accordingly, as described with examples provided, the transport arrangement system 100 calculates a predicted trip completion time for an actual (e.g., requested) or hypothetical (e.g., user wants estimated time of arrival before committing) trip. The predicted trip completion time can be based on a prospective pairing between the rider and an actual driver, where the addition of the requester modifies an existing trip. The predicted trip completion time can also be based on a hypothetical pairing in which the rider's route and impact on the rider pool would be based on statistical analysis of historical information 343.

In some implementations, a transport arrangement system 100, 300 selects one or more candidate drivers 305 for fulfilling a transport pooling request 301 from a requester. The selection of candidate drivers 305 may be subject to constraints 337, such as a constraint which requires a worst case trip completion time for the requester to not exceed a predefined constraint (e.g., not to exceed threshold minutes or duration as compared to non-worst case). The transport arrangement system 100, 300 can assign a selected driver to a transport pool request. In variations, the transport arrangement system 100, 300 can list available transport providers to a user making a request, with estimated trip completion times displayed to facilitate the user's selection.

In other variations, the requester can specify the constraint of time for the ride pool request. For example, the requester can specify that a ride pool transport is not to extend more than 5 minutes than what the rider could receive from a singular transport. In similar fashion, the requester can specify the constraint for distance. The constraints specified by the rider can be more or less than those set by default from the transport arrangement system 100, 300.

According to some examples, an existing rider of a vehicle can be provided an estimated time of arrival that is updated to reflect an additional rider whom may be added to the route. Still further, in variations, the estimated trip completion time can incorporate estimates of time delay based upon a deviation of the modified route for the requester and/or existing rider.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is being claimed is:

1. A network computer system comprising:
   one or more processors;
   a set of memory resources to store a set of instructions that, when executed by the one or more processors, cause the one or more processors to:
   receive, over one or more networks, a plurality of transport-related requests from a plurality of computing devices of requesters, each transport-related request specifying a set of parameters, including a pickup location and a drop-off location;
   select a service provider to provide a transport pool for a set of transport-related requests from the plurality of transport-related requests by:
   determining a number of service providers that satisfy criteria for providing the transport pool for each transport-related request of the set of transport-related requests, the criteria including (i) a distance proximity for each service provider of the number of service providers relative to the pickup locations of the set of transport-related requests, based on current location information provided by geo-aware components of a computing device of each service provider, and (ii) an availability state of each service provider of the number of service providers;
   determining, based at least in part on the number of service providers, a range of trip completion times for the set of transport-related requests to be fulfilled by the transport pool;
   determining an alternative trip completion time for a singular transport without transport pooling, based on the set of parameters;
   determining a first constraint that sets a limit for the range of trip completion times, based on the alternative trip completion time; and
   determining that the selected service provider from the number of service providers satisfies the first constraint.

2. The network computer system of claim 1, wherein determining the first constraint includes adding a predetermined extension to the alternative trip completion time.

3. The network computer system of claim 1, wherein the range of trip completion times is based on an assumption that at least a portion of a trip provided by the selected service provider is shared with another requester.

4. The network computer system of claim 1, wherein at least one of the range of trip completion times or the alternative trip completion time is based at least in part on historical information.

5. The network computer system of claim 1, wherein the range of trip completion times is based on a likelihood that at least a portion of a trip provided by the selected service provider is shared with another requester.

6. The network computer system of claim 1, wherein the set of instructions further cause the one or more processors to:
for each transport-related request, utilize the range of trip completion times to display, before when the corresponding requester starts to receive the transport pool from the selected service provider, a value that is based on a latest estimated time or duration for the corresponding requester to arrive at the drop-off location using the transport-related request.

7. The network computer system of claim 6, wherein the value is displayed on an interface before the corresponding requester triggers the transport-related request for the transport pool.

8. The network computer system of claim 7, wherein the value is displayed on an interface after the corresponding requester triggers the transport-related request for the transport pool.

9. The network computer system of claim 1, wherein selecting the service provider further includes:
determining a set of service providers that are fulfilling an existing transport-related request and that also satisfy the first constraint and a second constraint, the second constraint relating to an extension of time that would be added to the existing transport-related request to deviate the selected service provider from a planned route of the existing transport-related request to the pickup location of a second transport-related request of a second requester.

10. The network computer system of claim 1, wherein selecting the service provider further includes:
determining a second constraint that is based on a maximum number of requesters permitted in a vehicle of a service provider.

11. The network computer system of claim 1, wherein determining that the selected service provider satisfies the first constraint includes determining a range of completion times for the selected service provider.

12. The network computer system of claim 11, wherein the range of trip completion times includes an earliest arrival time and a latest arrival time, each of the earliest arrival time and latest arrival time being based on a different prediction as to a portion of a trip provided by the selected service provider being shared with another requester.

13. The network computer system of claim 1, wherein the set of instructions further cause the one or more processors to:
provide a time value for receiving the transport pool to a computing device of the corresponding requester, based on at least on the first constraint or a determined range of trip completion times for the selected service provider.

14. The network computer system of claim 13, wherein the time value is provided at any time after selection of the service provider for each transport-related request of the set of transport-related requests.

15. A non-transitory computer-readable medium storing instructions that, when executed by a processor of a transport arrangement system, causes the transport arrangement system to:
receive, over one or more networks, a plurality of transport-related requests from a plurality of computing devices of requesters, each transport-related request specifying a set of parameters, including a pickup location;
select a service provider to provide a transport pool for a set of transport-related requests from the plurality of transport-related requests by:
determining a number of service providers that satisfy criteria for providing the transport pool for each transport-related request of the set of transport-related requests, the criteria including (i) a distance proximity for each service provider of the number of service providers relative to the pickup locations of the set of transport-related requests, based on current location information provided by geo-aware components of a computing device of each service provider, and (ii) an availability state of each service provider of the number of service providers;
determining, based at least in part on the number of service providers, a range of trip completion times for the set of transport-related requests to be fulfilled by the transport pool;
determining an alternative trip completion time for a singular transport without transport pooling, based on the set of parameters;
determining a first constraint that sets a limit for the range of trip completion times based on the alternative trip completion time; and
determining that the selected service provider from the number of service providers satisfies the first constraint.

16. The non-transitory computer-readable medium of claim 15, wherein determining that the selected service provider satisfies the first constraint includes determining a range of completion times for the selected service provider.

17. The non-transitory computer-readable medium of claim 15, wherein the range of trip completion times includes an earliest arrival time and a latest arrival time, each of the earliest arrival time and latest arrival time being based on a different prediction as to a portion of a trip provided by the selected service provider being shared with another requester.

18. The non-transitory computer-readable medium of claim 15, wherein the instructions, when executed by the processor of the transport arrangement system, further causes the transport arrangement system to:
provide a time value for receiving the transport pool to a computing device of the corresponding requester, based on at least on the first constraint or a determined range of trip completion times for the selected service provider.

19. The non-transitory computer-readable medium of claim 15, wherein determining the first constraint includes adding a predetermined extension to the alternative trip completion time.

20. The non-transitory computer-readable medium of claim 15, wherein the range of trip completion times is based on an assumption that at least a portion of a trip provided by the selected service provider is shared with another requester.

\* \* \* \* \*